US008580323B2

(12) United States Patent
Yan et al.

(10) Patent No.: US 8,580,323 B2
(45) Date of Patent: Nov. 12, 2013

(54) METHOD FOR MAKING LACTOSE REMOVED MILK

(75) Inventors: Yiqian Yan, Shanghai (CN); Haixia Wang, Shanghai (CN); Meiying Cao, Shanghai (CN); Yimou Yan, Shanghai (CN)

(73) Assignee: Shanghai Shanglong Dairy Co., Ltd., Shanghai (CN)

( * ) Notice: Subject to any disclaimer, the term of this patent is extended or adjusted under 35 U.S.C. 154(b) by 484 days.

(21) Appl. No.: 12/355,535

(22) Filed: Jan. 16, 2009

(65) Prior Publication Data

US 2009/0123602 A1  May 14, 2009

Related U.S. Application Data

(63) Continuation-in-part of application No. PCT/CN2007/002170, filed on Jul. 16, 2007.

(30) Foreign Application Priority Data

Jul. 17, 2006  (CN) .......................... 2006 1 0029014

(51) Int. Cl.
| | | |
|---|---|---|
| A23C 9/12 | (2006.01) | |
| A23C 21/00 | (2006.01) | |
| A23C 17/00 | (2006.01) | |
| A23C 3/00 | (2006.01) | |
| A01J 25/11 | (2006.01) | |
| A01J 25/00 | (2006.01) | |

(52) U.S. Cl.
USPC .............. 426/39; 426/41; 426/42; 426/330.2; 426/478; 426/519

(58) Field of Classification Search
USPC ............. 426/36–40, 271, 319, 478, 583, 656, 426/599; 530/360, 361
See application file for complete search history.

(56) References Cited

U.S. PATENT DOCUMENTS

| | | | |
|---|---|---|---|
| 2,998,315 A * | 8/1961 | Peebles et al. ................. | 426/583 |
| 4,511,590 A * | 4/1985 | Caldwell ........................ | 426/580 |
| 5,429,829 A * | 7/1995 | Ernster, Sr. .................... | 426/36 |
| 6,881,428 B2 | 4/2005 | Lange | |
| 2005/0170044 A1 | 8/2005 | Lange | |
| 2005/0214409 A1 | 9/2005 | Tossavainen et al. | |

FOREIGN PATENT DOCUMENTS

| | | | |
|---|---|---|---|
| AU | 1972040606 A | | 10/1973 |
| CN | 1084700 A | | 4/1994 |
| CN | 1613333 A | | 5/2005 |
| CN | 1757289 A | * | 4/2006 |
| CN | 1784998 A | | 6/2006 |
| JP | 48-72360 A | | 9/1973 |
| JP | 53-20583 A | | 2/1978 |
| JP | 56-35958 A | | 4/1981 |
| JP | 60-192545 A | | 10/1985 |
| JP | 61-501955 A | | 9/1986 |
| JP | 6-303900 A | | 11/1994 |
| JP | 2000-102344 A | | 4/2000 |
| JP | 2005-525116 A | | 8/2005 |
| JP | 2005-537011 A | | 12/2005 |
| KR | 20040103818 A | | 12/2004 |
| WO | WO 85/02980 A | | 7/1985 |
| WO | WO 03/094623 A | | 11/2003 |
| WO | WO 2004/019693 A | | 3/2004 |
| WO | WO 2005/013709 A | | 2/2005 |

OTHER PUBLICATIONS

Jacob, M; Jaros, D, Rohm, H. Recent Advances in Milk Clotting Enzymes. International Journal of Dairy Technology (2011) 64(1): 14-33.*
The Technology of Making Cheese from Camel Milk (*Camelus dromedarius*). FAO Animal Production and Health paper (2001) http://www.fao.org/docrep/003/t0755e/t0755e03.htm accessed on Jun. 27, 2011.*
Li, Da et al., "Lactose Intolerance and Function Liquid Milk—Low Lactose Milk," Academic Periodical of Farm Products Processing, No. 11, pp. 33-35 (Nov. 2005).
Li, Wen et al., "Application and Development of Low-Lactose Milk," Food Industry Technology, vol. 24, No. 9, pp. 83-85 (Sep. 2003).
Nan, Qingxian et al., "Latest Development about the Application of Enzyme Technology on Diary Research," China Diary Industry, vol. 32, No. 12, pp. 22-25 (Dec. 2004).
Medical Encyclopedia, "A service of the U.S. national library of medicine and the national institutes of health," web print. (Oct. 2006).
Montalto, M et al., "Management and Treatment of Lactose Malabsorption" World Journal of Gastroenterol., 2006, vol. 12, No. 2, p. 187-191 (Jan. 2006).
European Food Tech Award to Valio Lactose Free Milk Technology (Apr. 2006). web print.
Maruzen Food Comprehensive Dictionary, p. 295, "curd" and "curdling enzyem," (Mar. 25, 1998).

* cited by examiner

*Primary Examiner* — Humera Sheikh
*Assistant Examiner* — Subbalakshmi Prakash
(74) *Attorney, Agent, or Firm* — Manni Li; Mei & Mark LLP

(57) ABSTRACT

A method for removing lactose from milk comprising the steps of precipitation, ultrafiltration, re-dissolving, mixing, and restoration, with or without a step of degreasing prior to precipitation. The lactose-removed diary product can be liquid milk, milk powder, or combined with other products to make sugar-free or low-sugar healthy food. The milk used in the method can be milk from any mammals or milk obtained by dissolving milk powder in drinking water.

21 Claims, No Drawings

METHOD FOR MAKING LACTOSE REMOVED MILK

CROSS-REFERENCE TO THE RELATED APPLICATIONS

This application is a continuation-in-part of PCT/CN2007/002170 filed on Jul. 16, 2007, which claims priority from Chinese Patent Application CN 200610029014.1 filed on Jul. 17, 2006; the contents of the PCT International application and Chinese priority application are incorporated herein by reference.

FIELD OF THE INVENTION

The present invention relates to a method for making lactose-free or low-lactose dairy products by using milk as a raw material. The dairy products can be lactose-free or low lactose liquid milk or lactose-free or low lactose solid milk powder.

BACKGROUND OF THE INVENTION

Lactose is a unique disaccharide which exists in the mammal breast milk and also the main carbohydrate in milk (more than 99.8% of the total sugar content). Normal fresh cow milk contains 4.8%~5.2% lactose, which is about 52% of non-fat cow milk solids and about 70% of the solid whey. The Medical Encyclopedia, a service of the U.S. national library of medicine and the National Institutes of Health, provides that, unless lactose is decomposed by enough lactase in the small intestine when it enters into the alimentary tract, lactose intolerance, including symptoms such as abdominal distension, abdominal pain, or diarrhea, occurs. Lactose intolerance happens more often in Asian, African, and Latin American. Lactose mainly comes from dairy products. In order to avoid lactose intolerance, people usually choose to change their diet style, avoid eating or drinking milk or dairy product. However, as reported in the World Journal of Gastorenterol., Vol. 12, No. 2, pages 187-191 (2006), quitting milk or dairy product can lead to absent diet structure and body nutrition imbalance. In order to solve the problem caused by having milk, a method mentioned in U.S. Pat. No. 6,881,428, U.S. Patent Application Publication 20050170044, and European Food Tech Award to Valio lactose free milk technology (2006/5/4) discloses that in nowadays milk processing, it is common to use lactase to hydrolyze milk lactose to decrease the lactose concentration and alleviate the discomfort associated with drinking milk. Unfortunately, this method produces glucose and galactose, the total molar concentration of which equal to that of the unhydrolyzed lactose, and the total sugar content is not reduced. Long-term or large-volume intake of this kind of milk will not help stabilizing diabetes patient's blood sugar. Removing the lactose of cow milk and decreasing total sugar content of cow milk are very important to ensure the consumer's good health. At present, there are methods for removing lactose from cow milk as reported in domestic or overseas publications. For example, U.S. Pat. No. 5,429,829 relates to a method of making flavorful de-lactose cheese products by using chymosin along with milk fermentation, however, this type of process makes the dairy product lose its nutritious whey part. U.S. Patent Application Publication 20050214409 discloses a method using membrane separation and column chromatography to remove lactose from milk which may reserve the nutritious whey part, unfortunately, the method is so inefficient that it is hard to be adopted in industrial production.

SUMMARY OF THE INVENTION

The present invention provides an effective method for removing lactose from milk. Specifically, the method uses cow milk as raw material, and after the steps of degreasing, precipitation, ultrafiltration, re-dissolving, mixing, and restoration, lactose-removed diary product is obtained.

In the method of the present invention, the liquid milk is degreased to obtain low-fat milk liquid and milk fat. The low-fat milk is being added with milk coagulant and calcium salt while being stirred to obtain milk curd. The milk curd is heated, stirred, and cut into curd particles and whey. The curd particles are dissolved in a milk dissolving solvent to obtain the re-dissolved milk solution, while lactose is removed from the whey via membrane separation to obtain a de-lactose whey liquid or de-lactose whey powder. Then, the re-dissolved milk solution and the de-lactose whey liquid or de-lactose whey powder are mixed and dissolved together, with or without adding the original milk fat, and emulsified by adding an emulsifier to produce lactose-free milk liquid. Alternatively, the lactose-free milk liquid is homogenized and disinfected to obtain liquid milk or dried to obtain lactose-free milk powder. In case that the first step of degreasing is skipped and the milk liquid is directed treated with coagulant and dissolved in a milk-dissolving solvent to form a re-dissolved milk solution, and the lactose is removed from the whey by membrane separation and restoration, one may obtain low-lactose liquid milk or low-lactose milk powder.

In the present invention, it is very important to dissolve the curd particles in a milk-dissolving solvent to produce the re-dissolved milk solution, and then, to re-mix the re-dissolved milk solution with the lactose-removed whey to produce lactose-free liquid milk or lactose-free solid milk powder. The method of the present invention may be used when the raw material is goat milk and produce lactose-free or low-lactose goat liquid milk or milk powder.

DETAILED DESCRIPTION OF THE INVENTION

The method of the present invention has accomplished the result through the following:

1. milk coagulation changes the composition of the milk, and causes the fat, protein, vitamins, and minerals to congregate in the curd. If the milk is degreased beforehand, the congregated density of the curd is increased and the residual amount of lactose in the curd particles is further reduced. On the base of the lactose's low molecular weight and it's water-soluble, membrane separation technique could double the effect of the lactose separation.

2. People used to process milk to get cheese or casein, the character and flavor of which are different from the original milk by using chymosin. Milk solvent, emulsifier, and homogenization portfolio from the present invention can restore curd to the re-dissolved milk.

3. Mixing the above-mentioned lactose-free whey with the re-dissolved milk to produce stable de-lactose milk whose character is almost the same as the original milk.

4. There is no occurrence of lactose intolerance in people who are lack of lactase or suffer from diabetes after having the lactose-free dairy product produced by the method of the present invention.

The National Standard of People's Republic of China (GB13432-2004) provides that the general standard for the labeling of prepackaged foods for special dietary uses says the sugar content (including monosaccharide and disaccharide) ≤0.5% is defined as no sugar. Usually when lactose of dairy product is less than 20%~50%, lactose intolerance hardly happens. Therefore, the lactose contained in the lactose-free milk produced by the method of the present invention is ≤0.5%; the lactose contained in the low-lactose milk produced by the method of the present invention is ≤2.5% (decreased to 50% lactose of total amount); the lactose contained in the full-fat low-lactose milk powder made from the method of the present invention is ≤20% (decreased to 50% lactose of total amount).

The method of the present invention provides the following steps: degreasing the milk at first; adding food-grade chymosin to separate whey from milk fat, protein, and mineral precipitate; re-dissolving the precipitate by using a curd solvent; removing lactose from the whey by using membrane separation technique; mixing fat, lactose-removed whey, and the re-dissolved milk; homogenizing and disinfecting the solution to produce lactose-removed milk or after drying, lactose-removed milk powder; alternatively, mixing the product with ordinary milk to produce low-lactose dairy product.

The lactose-free or low-lactose diary products are obtained by the following four groups of methods: the lactose-free liquid milk is obtained through steps A (1)~(6); lactose-free liquid milk is obtained through steps A (1)~(7), which may further be dried to obtain lactose-free milk powder or low-lactose liquid milk, or dried to obtain low-lactose milk powder; low-lactose liquid milk is obtained through steps B (1)~(5); low-lactose liquid milk is obtained through steps B (1)~(6) and further dried to obtain low-lactose milk powder.

A.
(1) Degreasing milk into de-fatted milk (0.2~2.0% fat) and milk fat.
(2) Adding milk coagulant and calcium salt solution while heating and stirring the de-fatted milk from A (1) to produce milk curd.
(3) Heating the milk curd then cutting and stirring to obtain curd particles and whey. Separate the curd from the whey.
(4) Using a milk solvent to dissolve the curd particles to produce the re-dissolved milk whose pH value should be controlled between 6.6 and 7.0.
(5) Using the membrane separation technique removes the lactose from the whey from A (3) and produce de-lactose whey or de-lactose whey powder.
(6) Mixing the re-dissolved milk from A (4) together with lactose-removed whey or lactose whey-removed powder from A (5). The milk fat is optionally added into the solution, and then using shear emulsion to produce lactose-free milk.
(7) Homogenizing and disinfecting the lactose-free milk from A (6). Drying the solution to produce lactose-removed milk powder; or homogenizing and disinfecting the lactose-free milk from A (6) together with common milk and drying the solution to production low-lactose milk powder.

B.
(1) Adding milk coagulant and liquid calcium salt while heating and stirring the milk to produce milk curd.
(2) Heating the milk curd then cutting and stirring it into curd particles and whey. Separate the curd from the whey.
(3) Using milk solvent to dissolve the curd particles to produce the re-dissolved milk which pH value should be controlled between 6.6 and 7.0.
(4) Using the membrane separation technique remove the lactose from the whey from B (2) and produce de-lactose whey or de-lactose whey powder.
(5) Mixing the re-dissolved milk from B (3) together with de-lactose whey or de-lactose whey powder from B (4). Use shear emulsion to produce low-lactose milk.
(6) Homogenizing and disinfecting the low-lactose milk. Or, dry it to produce low-lactose milk powder.

Lactose-free dairy product from the present invention includes lactose-free milk and lactose-free milk powder. Low-lactose dairy product from the present invention includes low-lactose milk and low-lactose milk powder.

The milk in the process may be fresh milk or obtained from dissolving food-grade milk powder dissolved in drinking water.

The chymosin in the process may be animal chymosin, botanical chymosin, or microbial chymosin. The animal chymosin may be calf chymosin or lamb chymosin. The botanical chymosin may be chymopapain. The microbial chymosin may be mucor chymosin. The acid supplement may be hydrochloric acid, lactic acid, citric acid, or carbon dioxide gas.

The milk-dissolving solvent in the process may be carbonate-citric acid buffer, citrate-citric acid buffer, or phosphate buffer; the buffering salt concentration of the re-dissolved milk solution is controlled between 0.005~0.03M, and the pH value of the re-dissolved milk solution is controlled between 6.6~7.0.

The emulsifier in the process includes sucrose ester and lecithin.

The condition of the emulsification reaction is that the shear emulsification in the process uses a speed of between 1000~4000 rpm, temperature between 25~60 Celsius and lasts about 10~60 min.

The membrane separation technique in the process includes ultrafiltration and nanofiltration. The type of ultrafiltration and nanofiltration is expressed in membrane material and molecular weight cutoff. For Ultrafiltration, the specification of the membrane material is polyethersulfone or ceramic. The ultrafiltration membrane molecular weight cutoff is between 5000~20000. For Nanofiltration, the specification of the membrane material is composite membrane or ceramic membrane. The nanofiltration membrane molecular weight cutoff is between 100~350.

The present invention also includes a method for making low-lactose milk having the steps of mixing lactose-removed milk or lactose-removed milk powder with common milk proportionally, homogenizing, and disinfecting.

The method of the present invention for making low-lactose milk powder has the steps of mixing lactose-removed milk or lactose-removed milk powder with common milk proportionally, homogenizing, disinfecting, and drying the solution.

The method of the present invention for making lactose-free or low-lactose cow milk is also applicable for making lactose-removed goat milk dairy product.

The method of the present invention has the following advantages:
1. The steps of producing curd make the process of removing the lactose from whey more effective and reduce the production cost.
2. Mixing the curd with whey and fat holds most nutrition except lactose.
3. De-lactose dairy product from the present invention is less in lactose and total sugar content, and at the same time keeps the original flavor.
4. The dairy product from the present invention can also be further made into other no-sugar or low-sugar healthy food.

The following examples are not meant to limit the scope of the present invention but only to illustrate the details of the producing process.

EXAMPLE 1

We degrease 100 kg milk which is from healthy cow, then heat the solution at 61 Celsius, 30 min for disinfection. After cooling the solution's temperature down to 41 Celsius, we add 100 ml 10% $CaCl_2$ and 0.2% calf chymosin into the solution slowly while stirring to produce milk curd. The curd's temperature soon increases to 45 Celsius. We then stir the curd to produce curd particles and whey. After filtering the whey out, we add 100 kg 45 Celsius purified water into the container with the curd particles while stirring and repeat the filtering once. Next step we collect the washed curd particles and dissolve it by using 0.01 mol potassium citrate-citric acid buffer to produce the re-dissolved milk which pH value is 6.7. After removing lactose from the whey by ultrafiltration and nanofiltration, we get de-lactose whey which contains minerals and vitamin. The final step we mix the re-dissolved milk and de-lactose whey with fat, then heating, homogenizing and disinfecting the solution to produce no-lactose milk, or further dry to de-lactose milk powder. The tested no-lactose milk contains lactose ≤05.%, total sugar ≤0.5%, fat ≥3.0%, protein ≥2.9%. we prove the de-lactose milk powder contains lactose ≤5%, total sugar ≤5%, protein ≥30%.

EXAMPLE 2

We dissolve the 10 kg food-grade skim milk powder (fat content ≤2.0%) with 90 kg water, and then add 3000 ml 10% calcium lactate and 1000 ml chymopapain solution while stirring, when the solution's temperature is increased to 39 Celsius, keep the status for 20 min. After the above-mentioned steps, the solution's temperature soon increases to 55 Celsius. We stir to crush the curd to produce curd particles and whey and then add 100 kg 45 Celsius purified water into the container with the curd particles while stirring and repeat the filtering once. Next step we collect the washed curd particles and dissolve it by using 0.01 mol potassium carbonate-citric acid buffer and 0.2% sucrose ester to produce the re-dissolved milk which pH value is 7.0. After removing lactose from the whey by ultrafiltration and nanofiltration, we get de-lactose whey which contains minerals. The final step we mix the re-dissolved milk with de-lactose whey, then heating, homogenizing and disinfecting the solution to produce lactose-free milk. We prove the no-lactose milk contains lactose ≤0.5%, total sugar ≤0.5%, fat ≥1.5%, and protein ≥2.9%.

EXAMPLE 3

We degrease the 100 kg milk which comes from healthy cow and add 1000 ml $CaCl_2$ into it while stirring. Keep the de-fat milk motionless for about 45 min, after adding 2N hydrochloric acid into the de-fat milk and make sure that its temperature is up to 41 Celsius and its pH value is down to 5.0. Finished the above steps, we obtains milk curd. We stir to crush the curd to produce curd particles and separated whey, and then add 100 kg purified water into the container with the curd particles while stirring and repeat the filtering until the pH value of the filtered water reaches 6.5. We collect the washed curd particles and dissolve it by using $K_2HPO_4$-$KH_2PO_4$ buffer to produce the re-dissolved milk which pH value is 7.0. After removing lactose from the whey, we get de-lactose whey which contains minerals. Mixing the re-dissolved milk and de-lactose whey to get 80 kg de-lactose milk. Homogenizing and disinfecting the solution after mixing the de-lactose milk with 80 kg fresh milk, low-lactose milk is obtained. We prove the Low-lactose milk that contains lactose ≤2.5%, total sugar ≤2.5%, fat ≥1.5%, and protein ≥2.9%.

EXAMPLE 4

We dissolve 10 kg skim milk powder (fat content ≤2.0%) by 90 kg water to get skim milk. Use lactic acid and citric acid buffer in the skim milk to produce the re-dissolved milk. Homogenizing and disinfecting after mixing 1 kg high-protein de-lactose whey powder, 1 kg milk fat and 0.02 kg lecithin with the re-dissolved milk, no-lactose milk is obtained. We prove the no-lactose milk that contains lactose ≤0.5%, total sugar ≤0.5%, fat ≥1.5%, and protein ≥2.9%.

EXAMPLE 5

We degrease the 100 kg milk which comes from healthy cow and add 1000 ml $CaCl_2$, 0.2% mucor chymosin solution, and 1N hydrochloric acid into it while stirring. Keep the milk motionless for about 45 min, after making its temperature is up to 39 Celsius and its-pH value is down to 6.5. Finished the above steps, we obtains milk curd. We stir to crush the curd to produce curd particles and separated whey, and then add 100 kg purified water into the container with the curd particles while stirring and repeat the filtering once. We collect the washed curd particles and dissolve it by using sodium citrate-citric acid buffer to produce the re-dissolved milk which pH value is 6.8. After removing lactose from the whey by membrane filtration, we get de-lactose whey which contains minerals. Mixing the re-dissolved milk with de-lactose whey to get 80 kg de-lactose milk, homogenizing and disinfecting the solution to produce low-lactose milk, we prove the low-lactose milk that contains lactose ≤2.5%, total sugar ≤2.5%, fat ≥3%, and protein ≥2.9%.

EXAMPLE 6

We add chymopapain, $CaCl_2$ solution into 1 kg goat milk to produce milk curd and whey, and then dissolve the curd by citric acid buffer which pH value is 7.0 to get the re-dissolved milk. Afterward, we remove lactose from the whey by membrane filtration. The final step is mixing the re-dissolved milk with de-lactose whey and after homogenizing we obtain no-lactose goat milk. We prove the no-lactose goat milk that contains lactose ≤0.5%, total sugar ≤0.5%, fat ≥1.5%, and protein ≥2.9%.

We claim:
1. A process for making lactose-removed dairy product comprising:
  degreasing milk to obtain low-fat milk and milk fat,
  heating and coagulating the low-fat milk in presence of a milk coagulant and a calcium salt solution to obtain milk curd,
  stirring and cutting the milk curd to form curd particles and whey while heating, and separating the curd particles from the whey,
  dissolving the curd particles in a milk-dissolving solvent to form a re-dissolved milk solution, and controlling pH of the re-dissolved milk solution at between 6.6 and 7.0,
  removing lactose from the whey through membrane separation by ultrafiltration having a molecular weight cutoff between 5,000 to 20,000, and further removing lactose from the whey by nanofiltration having a molecular weight cutoff between 100 to 350, to obtain a lactose-removed whey, and
  mixing the re-dissolved milk solution with the lactose-removed whey, and emulsifying a mixture of the re-dissolved milk solution and the lactose-removed whey in a shear emulsification reaction to obtain a lactose-removed liquid milk,
  wherein the milk-dissolving solvent is a mixture of a citrate-citric acid buffer and a phosphate buffer, and total concentration of the phosphate and the citrate in the re-dissolved milk solution is between 0.005M to 0.03M, and wherein the shear emulsification reaction is performed at a temperature of 25 to 60 degree Celsius, at a speed of 1000 rpm to 4000 rpm, and lasts for about 10 to 60 minutes.

2. The process of claim 1, wherein the milk to be degreased is fresh cow milk, fresh goat milk, or milk obtained from dissolving food-grade milk powder in drinking water.

3. The process of claim 1, wherein fat content of the low-fat milk is between 0.2% to 2.0%.

4. The process of claim 1, wherein the coagulant is a chymosin, an acid supplement, or a mixture thereof.

5. The process of claim 4, wherein the chymosin is an animal chymosin that is calf chymosin or lamb chymosin.

6. The process of claim 4, wherein the chymosin is a botanical chymosin that is chymopapain.

7. The process of claim 4, wherein the chymosin is a microbial chymosin that is mucor chymosin.

8. The process of claim 4, wherein the acid supplement is hydrochloric acid, lactic acid, citric acid, or carbon dioxide gas.

9. The process of claim 1, wherein the calcium salt is calcium chloride, calcium citrate, or calcium lactate.

10. The process of claim 1, wherein the milk fat is added to the mixture of the re-dissolving milk solution and the lactose-removed whey prior to the shear emulsification.

11. The process of claim 1, further comprising
homogenizing and disinfecting the lactose-removed liquid milk, and
drying the lactose-removed liquid milk to obtain a lactose-removed milk powder.

12. The process of claim 11, further comprising
adding ordinary milk or milk powder to the lactose-removed liquid milk prior to homogenization and disinfection or the lactose-removed milk powder to obtain low-lactose milk or low-lactose milk powder.

13. A process for making low-lactose dairy product comprising:
heating and coagulating milk in presence of a milk coagulant and a calcium salt solution to obtain milk curd,
stirring and cutting the milk curd to form curd particles and whey while heating, and separating the curd particles from the whey,
dissolving the curd particles in a milk-dissolving solvent to form a re-dissolved milk solution, and controlling pH of the re-dissolved milk solution at between 6.6 and 7.0,
removing lactose from the whey through membrane separation via ultrafiltration having a molecular weight cutoff between 5,000 and 20,000, and further removing lactose from the whey by nanofiltration having a molecular weight cutoff between 100 to 350, to obtain a lactose-removed whey, and
mixing the re-dissolved milk solution with the lactose-removed whey, and emulsifying a mixture of the re-dissolved milk and the lactose-removed whey in a shear emulsification reaction to obtain a low-lactose liquid milk,
wherein the milk-dissolving solvent is a mixture of a citrate-citric acid buffer and a phosphate buffer, and total concentration of the phosphate and the citrate in the re-dissolved milk solution is between 0.005M to 0.03M, and
wherein the shear emulsification reaction is performed at a temperature of 25 to 60degree Celsius, at a speed of 1000rpm to 4000rpm, and lasts for about 10 to 60 minutes.

14. The process of claim 13, wherein the milk is goat milk.

15. The process of claim 13, wherein the coagulant is a chymosin, an acid supplement, or a mixture thereof.

16. The process of claim 15, wherein the chymosin is an animal chymosin that is calf chymosin or lamb chymosin.

17. The process of claim 15, wherein the chymosin is a botanical chymosin that is chymopapain.

18. The process of claim 15, wherein the chymosin is a microbial chymosin that is mucor chymosin.

19. The process of claim 15, wherein the acid supplement is hydrochloric acid, lactic acid, citric acid, or carbon dioxide gas.

20. The process of claim 13, wherein the calcium salt is calcium chloride, calcium citrate, or calcium lactate.

21. The process of claim 13, further comprising homogenizing and disinfecting the low-lactose liquid milk, and drying to obtain a low-lactose milk powder.

\* \* \* \* \*